(12) United States Patent
Tran

(10) Patent No.: US 7,002,719 B2
(45) Date of Patent: Feb. 21, 2006

(54) MIRROR FOR AN INTEGRATED DEVICE

(75) Inventor: Alex T. Tran, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 106 days.

(21) Appl. No.: 10/342,530

(22) Filed: Jan. 15, 2003

(65) Prior Publication Data
US 2004/0136045 A1  Jul. 15, 2004

(51) Int. Cl.
*G02B 26/08* (2006.01)

(52) U.S. Cl. .................. 359/223; 359/224; 359/900

(58) Field of Classification Search ........ 359/198–199, 359/223–224, 298, 900
See application file for complete search history.

(56) References Cited

U.S. PATENT DOCUMENTS

| | | | | |
|---|---|---|---|---|
| 3,896,338 A | * | 7/1975 | Nathanson et al. | 315/373 |
| 5,233,456 A | * | 8/1993 | Nelson | 359/214 |
| 5,552,924 A | * | 9/1996 | Tregilgas | 359/224 |
| 6,201,631 B1 | | 3/2001 | Greywall | 359/245 |

* cited by examiner

Primary Examiner—James Phan

(57) ABSTRACT

A mirror for an optical MEMS device has a plurality of segments supported on a substrate layer. Each segment includes a support post, a support layer, and a reflective layer formed over the support layer. The reflective layers of the plurality of segments form the reflective surface of the mirror. Due to the relatively small lateral dimensions of the segments, the mirror has a smaller thermal bow than prior art mirrors. The bow can be controlled, e.g., by appropriately choosing the number of segments and the layer thicknesses.

18 Claims, 6 Drawing Sheets

MIRROR FOR AN INTEGRATED DEVICE

BACKGROUND OF THE INVENTION

1. Field of the Invention

The invention relates to optical communication equipment and, more specifically, to micro-electromechanical devices for use in such equipment.

2. Description of the Related Art

Optical communication equipment often employs micro-electromechanical systems (MEMS). A typical MEMS system may include an array of micro-machined mirrors, each mirror individually movable in response to an electrical signal. Such an array may be employed in an optical cross-connect, in which each mirror in the array receives a beam of light, for example, from an input optical fiber. The beam is reflected from the mirror and can be redirected to a different location, e.g., at which is located an output optical fiber. The particular output fiber may be selected by rotating the mirror. For better reflectivity, the mirror is typically coated with a thin layer of metal, e.g., gold or aluminum. More details on the principle of operation and methods of manufacture of MEMS devices including mirror arrays may be found, for example, in commonly assigned U.S. Pat. No. 6,201,631, the teachings of which are incorporated herein by reference.

One problem with prior art MEMS devices having metal-coated mirrors is thermo-induced bowing. More specifically, the mirror often becomes deformed, e.g., curled up, due to a mismatch in thermal expansion characteristics of the metal layer and the underlying substrate (typically silicon). This behavior may cause optical aberration and result in undesirable attenuation or even complete loss of the communication signal.

SUMMARY OF THE INVENTION

The problems in the prior art are addressed, in accordance with the principles of the present invention, by a segmented mirror for an optical MEMS device, which mirror has a plurality of segments supported on a substrate layer. Each segment includes a support post, a support layer, and a reflective layer formed over the support layer. The reflective layers of the plurality of segments form the reflective surface of the mirror. Due to the relatively small lateral dimensions of the segments, the mirror has a smaller thermal bow than prior art mirrors. The bow can be controlled, e.g., by appropriately choosing the number of segments and the layer thicknesses.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1B:
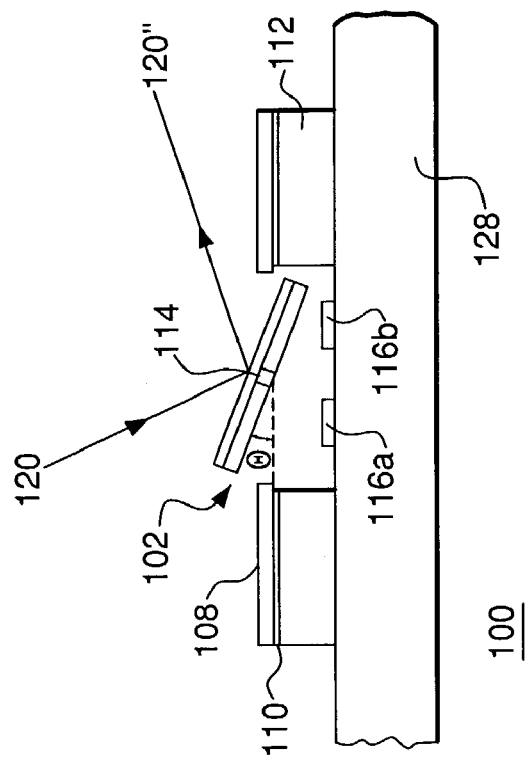
FIGS. 1A–B show cross-sectional views of a representative prior-art MEMS device having a movable mirror.
Figure 1A:
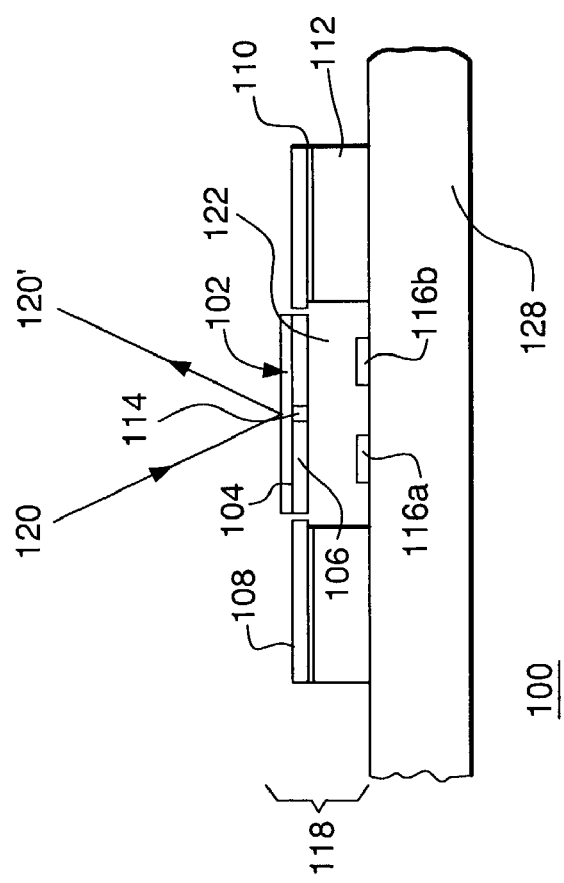

FIG. 1A shows a cross-sectional view of a representative prior-art MEMS device 100 having a movable mirror 102. Mirror 102 has two layers: a mirror substrate layer 106 and a specularly reflective metal layer 104. Substrate layer 106 is formed from an overlayer 108 of a wafer 118 using, e.g., reactive etching. Metal layer 104 is then deposited onto substrate layer 106 using, e.g., electron beam evaporation, sputtering, electroplating, or chemical vapor deposition. Wafer 118 has two additional layers: a thin insulating layer 110 and a support layer 112. Insulating layer 110 electrically isolates overlayer 108 from support layer 112. Overlayer 108 and support layer 112 may be silicon, insulating layer 110 may be silicon oxide, and metal layer 104 may be gold. Mirror 102 is supported above a cavity 122 by a pair of springs 114, e.g., torsional members, connected to overlayer 108. Cavity 122 is defined in insulating layer 110 and support layer 112. A second wafer 128 includes electrodes 116a–b as well as electrical interconnections (not shown). Support layer 112 is attached to wafer 128 such that electrodes 116a–b are located beneath mirror 102 in cavity 122. Mirror 102 and electrodes 116a–b form an actuator of device 100.

FIG. 1B illustrates how a beam of light 120 impinging on layer 104 of mirror 102 can be redirected from direction 120 (FIG. 1A) to direction 120 using mirror rotation. Mirror 102 rotates about the axis defined by springs 114 in response to voltages applied to electrodes 116a–b. For example, when electrode 116b is biased, mirror 102 rotates clockwise, as shown in FIG. 1B. Similarly, when electrode 116a is biased, mirror 102 rotates counterclockwise. Changing bias voltages changes the rotation angle (θ) thus redirecting beam 120.

Typically, deviation of ambient temperature (T) from an equilibrium temperature ($T_e$) during device manufacturing or operation will produce thermal stress (σ) in layers 104 and 106 due to a mismatch in their thermal expansion coefficients $\alpha_m$ and $\alpha_s$, respectively. For example, thermal stress in metal layer 104 can be expressed as follows:

$$\sigma = B_m(\alpha_s - \alpha_m)\Delta T \quad (1)$$

where $B_m$ is the biaxial modulus of metal layer 104 and $\Delta T = T - T_e$. The equilibrium temperature might be, for example, the temperature at which metal layer 104 was deposited onto substrate layer 106. The equilibrium temperature might change over time if device 100 is subjected to thermal cycling events or annealed. Using Equation (1), one can estimate that, for $\Delta T = +100$ K, thermal stress on the order of –200 MPa is generated.

Thermal stress causes mirror 102 to deform and the deformation curvature (R) can be expressed as follows:

$$R = \frac{B_s t_s^2}{6 \sigma t_m} \quad (2)$$

where $B_s$ is the biaxial modulus of substrate layer 106 and $t_m$ and $t_s$ are the thicknesses of layers 104 and 106, respectively. For a representative mirror 102 having layers 104 and 106 that are 0.5 and 2 $\mu$m thick, respectively, the deformation curvature R is on the order of 1 mm. Using the deformation curvature, one can obtain the thermal bow (b) of mirror 102 as follows:

$$b = r^2/2R = \frac{3B_m r^2 t_m}{B_s t_s^2}(\alpha_s - \alpha_m)\Delta T \qquad (3)$$

where r is the lateral dimension (e.g., radius) of mirror 102. For a representative circular mirror 102 with the radius of 250 $\mu$m, the corresponding bow would be in excess of 20 $\mu$m, which could cause optical aberration and result in undesirable attenuation or even complete loss of signal.

To reduce signal attenuation due to thermo-induced bowing to an acceptable level, the mirror employed in an optical MEMS device, such as device 100, should preferably be optically flat to within, e.g., $\lambda/20$, where $\lambda$ is the wavelength of light in beam 120. Thus, for use with light having a wavelength of 1550 nm, the mirror should preferably be flat to within about 0.08 $\mu$m. It is therefore desirable to provide a mirror for device 100 whose thermal bow is significantly reduced compared to that of mirror 102.

Figure 2A:
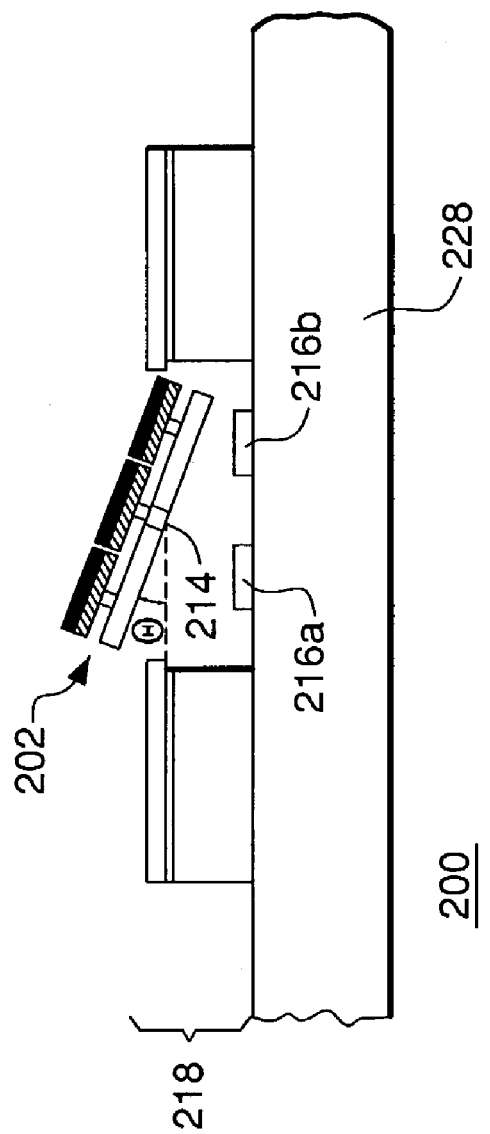
FIG. 2A shows a cross-sectional view of a MEMS device according to one embodiment of the present invention.
Figure 2C:
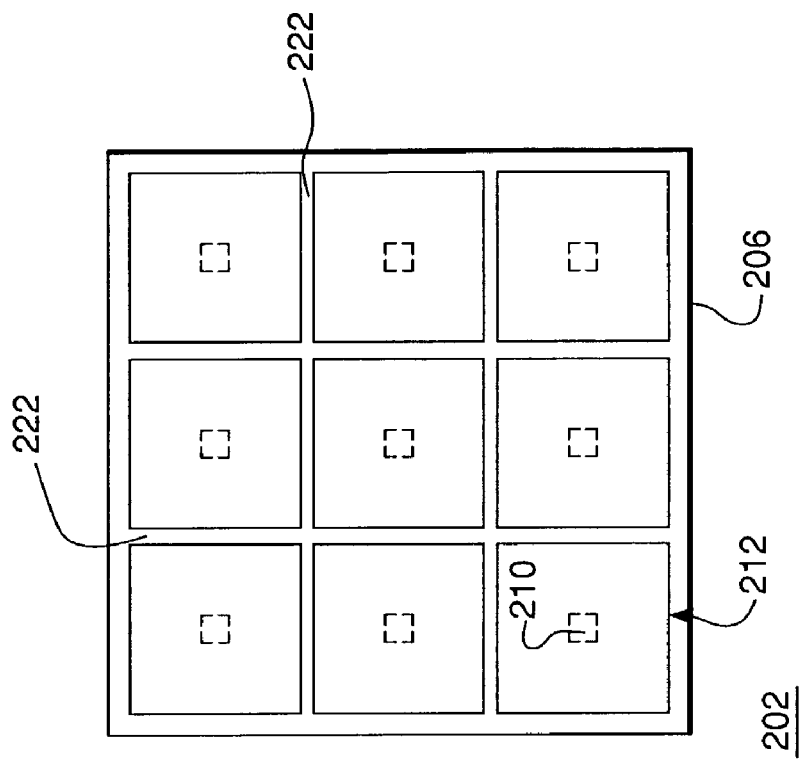
FIGS. 2B–C show cross-sectional and top views of a movable segmented mirror in the MEMS device of FIG. 2A.
Figure 2B:
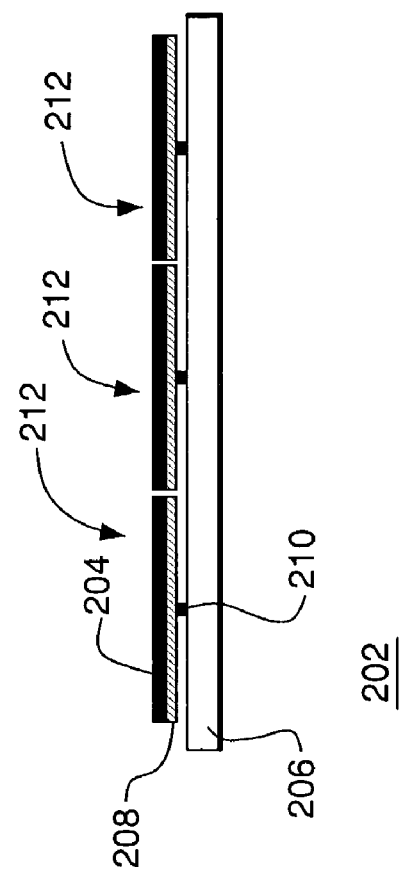

FIGS. 2A–C illustrate a MEMS device 200 having a movable segmented mirror 202 according to one embodiment of the present invention. More specifically, FIG. 2A shows a cross-sectional view of device 200 and FIGS. 2B–C show cross-sectional and top views, respectively, of segmented mirror 202.

Referring to FIG. 2A, device 200 is similar to device 100 of FIG. 1. For example, device 200 includes wafers 218 and 228 that are similar to wafers 118 and 128, respectively, of device 100. Similar to mirror 102 of device 100, mirror 202 of device 200 rotates about the axis defined by springs 214 in response to voltages applied to electrodes 216*a–b*. FIG. 2A depicts mirror 202 in a rotated state similar to that of mirror 102 shown in FIG. 1B.

One difference between devices 200 (FIG. 2A) and 100 (FIGS. 1A–B) is that the structure of mirror 202 is different from that of mirror 102. Referring to FIGS. 2B–C, mirror 202 has a mirror substrate layer 206, which is similar to substrate layer 106 of mirror 102. However, in addition to substrate layer 206, mirror 202 has a plurality of rectangular segments 212. Illustratively, nine segments 212 are shown in FIG. 2C. Each segment 212 includes (A) a mirror support layer 208 mounted on substrate layer 206 using a support post 210 and (B) a specularly reflective metal layer 204 formed over support layer 208. In one implementation, post 210, support layer 208, and reflective layer 204 may be silicon dioxide, poly-silicon, and gold, respectively. In another implementation, post 210, support layer 208, and reflective layer 204 may be a polymer, amorphous silicon, and gold, respectively. Representative thicknesses may be 5 $\mu$m for substrate layer 206 and 0.5 $\mu$m for each of reflective layer 204, support layer 208, and post 210. The lateral dimensions of the support post are preferably substantially smaller than the lateral dimensions of the reflective and support layers such that the reflective and support layers are substantially free to bow in response to a difference between the ambient temperature and the equilibrium temperature for the reflective and support layers.

Figure 3B:
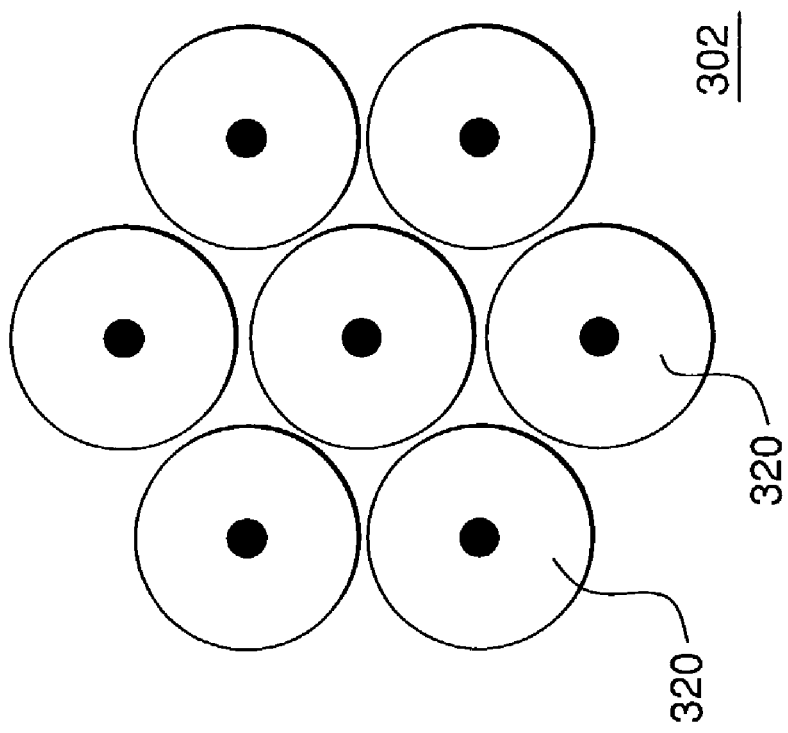
FIGS. 3A–B show representative patterns for segmented mirrors according to alternative embodiments of the present invention.
Figure 3A:
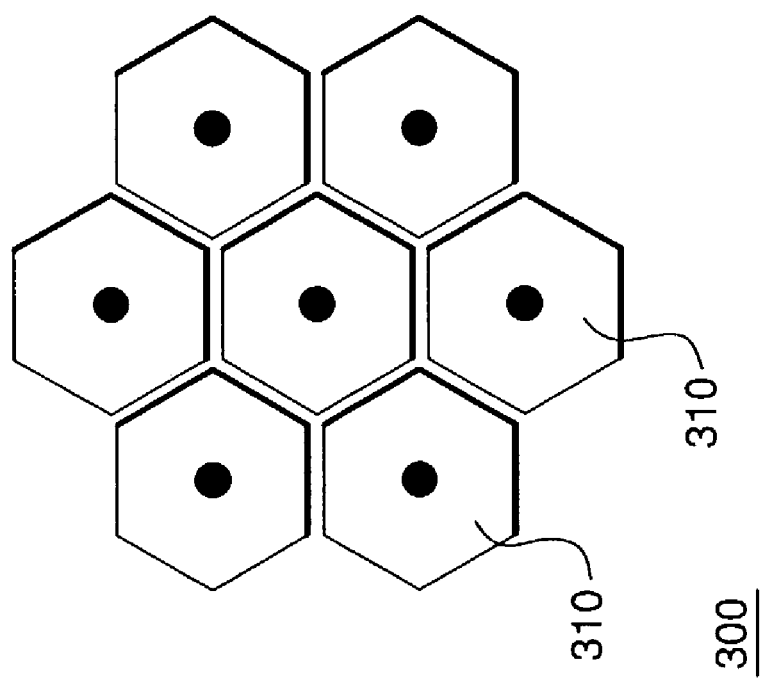

FIGS. 3A–B illustrate two other possible patterns formed by segments in segmented mirrors of the present invention. In particular, FIG. 3A shows a partial top view of a segmented mirror 300 having a plurality of hexagonal segments 310. Similarly, FIG. 3B shows a partial top view of a segmented mirror 302 having a plurality of circular segments 320. One skilled in the art will understand that different patterns formed by differently shaped segments may similarly be used.

Figure 4:
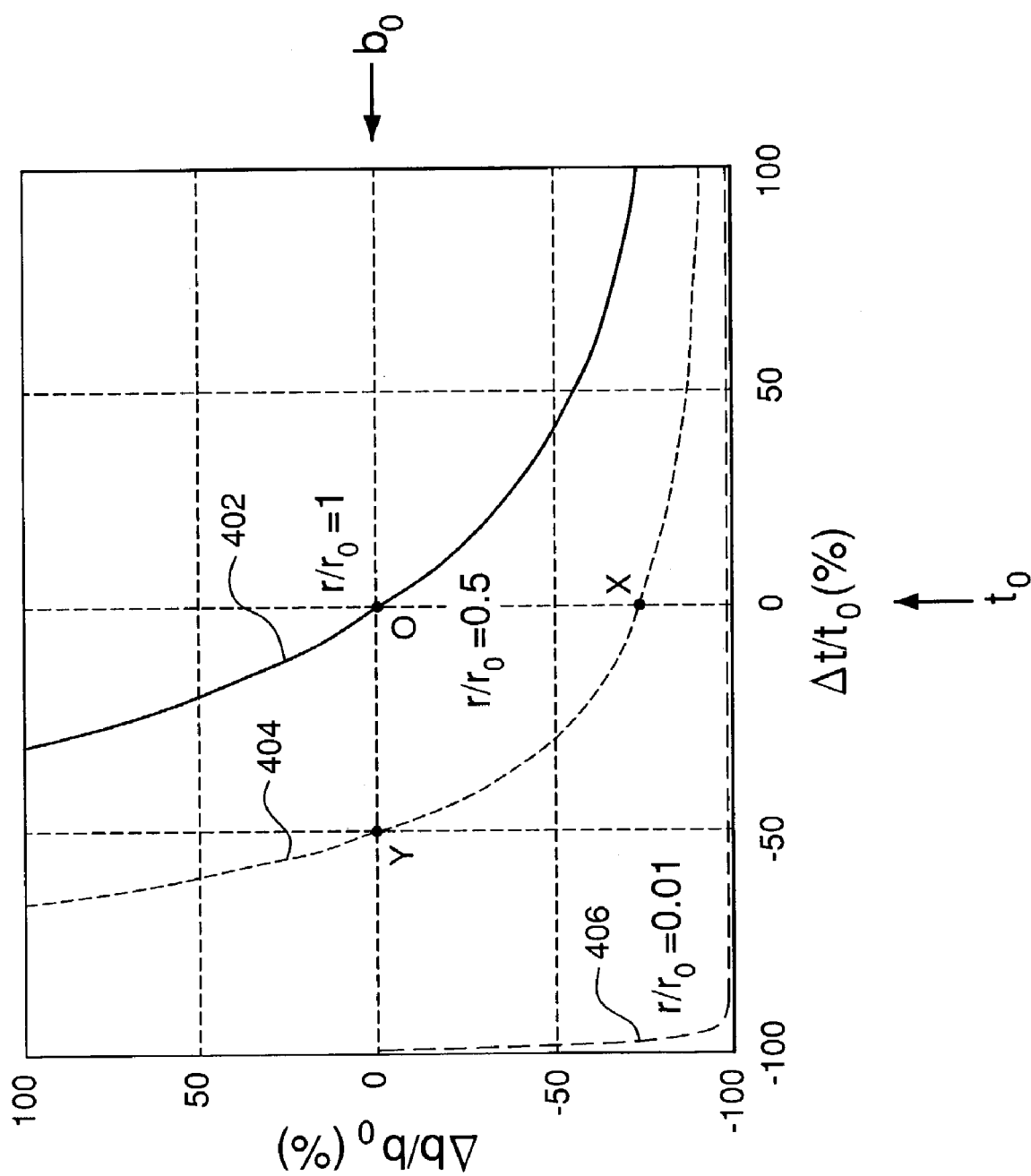
FIG. 4 graphically illustrates the thermal bow in a segmented mirror as a function of the dimensions of the mirror segments.

FIG. 4 graphically illustrates the thermal bow in a segmented mirror as a function of the dimensions of the mirror segments. More specifically, the curves shown in FIG. 4 correspond to a mirror, whose segments form the pattern shown in FIG. 3B. All values are normalized using the corresponding values for mirror 102 of FIG. 1, where $r_0$, $t_0$, and $b_0$ designate the radius and thickness of the substrate layer and the thermal bow, respectively, for mirror 102. The following notation is used: $\Delta b = b - b_0$ and $\Delta t = t - t_0$, where b and t are the thermal bow and the thickness of the support layer in each segment. The results of FIG. 4 correspond to the same thickness of the metal layer for each curve.

Curve 402 illustrates the prior art approach to reducing the thermal bow. More specifically, curve 402 shows the behavior of circular mirror 102. Curve 402 indicates that the thermal bow increases when the thickness of the substrate layer decreases, and vice versa. For example, when the thickness of substrate layer 106 in mirror 102 is increased two-fold (by 100%), the thermal bow is reduced four-fold (by 75%). An increase in the thickness, however, is often undesirable because it increases the inertia of mirror 102, which may decrease the operating speed of device 100. In addition, a thickness of substrate layer 106 corresponding to an acceptable thermal bow may be too large for practical fabrication. For example, to achieve optical flatness of better than $\lambda/20$ for visible light, substrate layer 106 may need to be over 20 $\mu$m thick. Such a thickness is not very practical for implementing springs 114 in device 100.

Equation (3) can be used to describe the behavior of an individual segment in a segmented mirror if the values in that equation having indices m and s correspond to the metal and support layers (e.g., layers 204 and 208 in mirror 202 of FIG. 2), respectively, and r is the radius of the segment. Furthermore, the bow of one individual segment having the maximum thermal bow can be used as an estimate for the total thermal bow of the segmented mirror. Then, using Equation (3), one finds that the thermal bow can be reduced, for example, (i) by decreasing the lateral dimensions of the segments while keeping the number of segments constant, (ii) by increasing the number of segments while keeping the total area of the mirror constant, (iii) by increasing the thickness of support layer 208, or (iv) by increasing the biaxial modulus of support layer 208.

Curve 404 shows the behavior of segmented mirror 302 having two segments 320. Comparing curves 402 and 404, one finds that, for a fixed thickness of the support layer, the thermal bow is reduced four-fold, for example, from that of point O (curve 402) to that of point X (curve 404). Alternatively, to achieve the same value of thermal bow, the thickness of the support layer can be reduced two-fold, for example, from that of point O to that of point Y (curve 404).

Curve 406 shows the behavior of mirror 302 having one hundred segments 320. Curve 406 demonstrates that almost 100% bow reduction can be achieved even using a relatively thin support layer. Together, curves 402–406 indicate that the desired extent of bow reduction can be realized by appropriately choosing the number of segments and the thickness of the support layer in those segments. Further bow reduction can be realized by appropriately tailoring the biaxial modulus and coefficient of thermal expansion of the support layer in those segments. Based on an acceptable value of the thermal bow for a segmented mirror and a desired operating temperature range for a device employing that mirror, the dimensions and the number of the segments in the segmented mirror can be properly chosen. For example, the thermal bow can be kept under 0.08 µm for an operating temperature range of from about 200 K to about 400 K (i.e., |ΔT|=100 K assuming an equilibrium temperature $T_e$ of 300 K) using mirror 202 having a width and length of 500 µm each, one hundred identical square segments 212 arranged in a square pattern, and the thicknesses of 5 µm for substrate layer 206 and 0.5 µm for each of reflective layer 204, support layer 208, and post 210.

Different techniques may be used to fabricate mirrors of the present invention. For example, chemical vapor deposition, plasma etching, and liquid-phase etching may be employed. Segmented structures may be mapped onto the corresponding layers using lithography. Modern lithographic techniques are capable of defining details whose size is as small as about 0.25 microns. Implementing relatively narrow gaps between the segments (e.g., gaps 222 in FIG. 2C) helps to reduce optical signal losses due to those gaps. For example, mirror 202 having a total length and width of 500 µm each and one hundred identical square segments 212 arranged in a square pattern and separated by 0.3 µm gaps would have a signal loss due to those gaps of less than 0.5 dB.

Figure 5C:
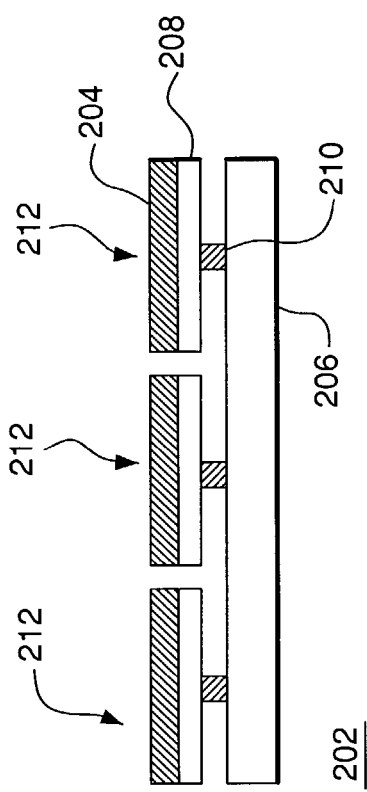
FIGS. 5A–C show a series of cross-sectional views corresponding to different fabrication steps for the segmented mirror of FIGS. 2B–C according to one embodiment of the present invention.
Figure 5A:
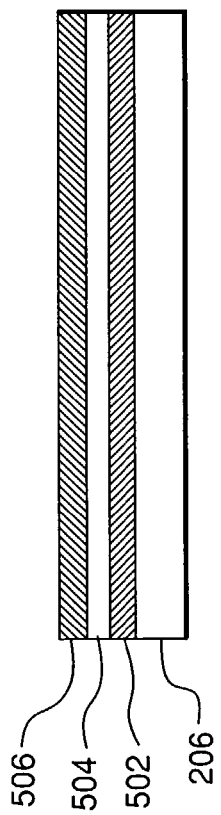
Figure 5B:
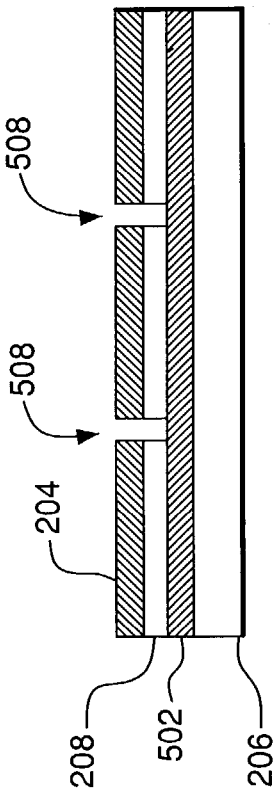

FIGS. 5A–C show a series of cross-sectional views corresponding to different fabrication steps of mirror 202 according to one embodiment of the present invention. Referring to FIG. 5A, three different layers 502, 504, and 506, illustratively, a polymer, amorphous silicon, and gold, respectively, are successively deposited over substrate layer 206. Layers 504 and 506 are then partitioned into a plurality of structures 204 and 208 corresponding to different segments 212 by forming trenches 508, e.g., using reactive etching (FIG. 5B). Then, portions of layer 502 are removed, e.g., by exposing the polymer to an oxygen plasma, to form posts 210 as shown in FIG. 5C. The diameter of posts 210 can be controlled by appropriately choosing the plasma temperature and exposure time.

While this invention has been described with reference to illustrative embodiments, this description is not intended to be construed in a limiting sense. For example, different segments in the same mirror may have different shapes, dimensions, and/or layer thicknesses. Although fabrication steps for mirror 202 were described in the context of using a particular set of materials, other suitable materials and structures such as, for example, pure aluminum, alloyed aluminum (e.g., Al—Si—Cu), and multi-layered structures (e.g., Ti/Au, Cr/Au, Ti/Pt/Au, and Ti/Pd/Au) for the metal layer, crystalline silicon, amorphous silicon, silicon nitride, and silicon oxide for the support layer, and metal, polycrystalline silicon, silicon oxide (e.g., TEOS (tetra-ethoxy-silane), BPSG (borophosphosilicate glass), PSG (phosphosilicate glass), CVD oxide, low temperature oxide, or spin-on glass), and polymers (e.g., polyimides and photo-resists) for the support posts, may similarly be used without departing from the scope and principle of the invention. Additional adhesive layers or surface modification may be used as known in the art to achieve good bonding between various layers. Depending on the particular set of materials, a different appropriate combination of fabrication techniques may be used to implement the fabrication steps. Various modifications of the described embodiments, as well as other embodiments of the invention, which are apparent to persons skilled in the art to which the invention pertains are deemed to lie within the principle and scope of the invention as expressed in the following claims.

Although the invention has been described in the context of movable mirrors for MEMS devices, the invention can also be implemented in the context of stationary mirrors for other types of integrated devices.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A mirror for an integrated device, comprising:
   a substrate layer and a plurality of segments mounted on the substrate layer, wherein each segment includes:
   (i) a reflective layer formed over a support layer; and
   (ii) a support post attached between the substrate layer and the support layer, wherein the mirror is part of a MEMS device in which the mirror is adapted to move relative to the rest of the MEMS device in response to an applied actuator voltage.

2. The invention of claim 1, wherein at least one segment is a hexagon.

3. The invention of claim 1, wherein:
   the reflective layer is a metal layer;
   the substrate and support layers comprise silicon; and
   the support post comprises silicon dioxide.

4. The invention of claim 1, wherein the lateral dimensions of the support post are substantially smaller than the lateral dimensions of the reflective and support layers such that the reflective and support layers are substantially free to bow in response to a difference between ambient temperature and an equilibrium temperature for the reflective and support layers.

5. An integrated device, comprising a mirror, wherein:
   the mirror includes a substrate layer and a plurality of segments mounted on the substrate layer;
   each segment includes:
   (i) a reflective layer formed over a support layer; and
   (ii) a support post attached between the substrate layer and the support layer; and
   the device is a MEMS device in which the mirror is adapted to move relative to the rest of the MEMS device in response to an applied actuator voltage.

6. The invention of claim 5, wherein at least one segment is a hexagon.

7. The invention of claim 5, wherein:
   the reflective layer is a metal layer;
   the substrate and support layers comprise silicon; and
   the support post comprises silicon dioxide.

8. The invention of claim 5, wherein the lateral dimensions of the support post are substantially smaller than the lateral dimensions of the reflective and support layers such that the reflective and support layers are substantially free to bow in response to a difference between ambient temperature and an equilibrium temperature for the reflective and support layers.

9. A method of fabricating a mirror for an integrated device, comprising:
   forming a plurality of segments on a substrate layer, wherein:
   the mirror includes the substrate layer and the plurality of segments;
   each segment includes:
   (i) a reflective layer formed over a support layer; and (ii) a support post attached between the substrate layer and the support layer; and the device is a MEMS device in which the mirror is adapted to move relative to the rest of the MEMS device in response to an applied actuator voltage.

10. The method of claim 9, wherein forming the plurality of segments comprises:
    forming a first layer over the substrate layer;
    forming a second layer over the first layer; and
    forming a third layer over the second layer, wherein, for each segment of the plurality of segments:
       the reflective layer is formed in the third layer;
       the support layer is formed in the second layer; and
       the support post is formed in the first layer.

11. The method of claim 10, wherein forming the plurality of segments further comprises:
    forming trenches in the second and third layers to form a plurality of structures corresponding to the plurality of segments; and
    removing portions of the first layer to form the support posts.

12. The method of claim 9, further comprising selecting a number of segments for the plurality of segments such that, for a given operating temperature range, the thermal bow of the mirror is less than a specified value.

13. The method of claim 12, further comprising selecting the specified value based on a wavelength l of light with which the integrated device is to operate.

14. The method of claim 9, further comprising selecting the thicknesses of the reflective and support layers such that, for a specified operating temperature range, the thermal bow of the mirror is less than a specified value.

15. The method of claim 9, further comprising selecting materials for the reflective and support layers based on the material's moduli such that, for a specified operating temperature range, the thermal bow of the mirror is less than a specified value.

16. The method of claim 9, further comprising selecting materials for the reflective and support layers based on the material's thermal expansion properties such that, for a specified operating temperature range, the thermal bow of the mirror is less than a specified value.

17. The method of claim 9, wherein the lateral dimensions of the support post are substantially smaller than the lateral dimensions of the reflective and support layers such that the reflective and support layers are substantially free to bow in response to a difference between ambient temperature and an equilibrium temperature for the reflective and support layers.

18. A mirror for an integrated device, comprising:
    a plurality of segments mounted on a substrate layer, wherein each segment includes:
       (i) a reflective layer formed over a support layer; and
       (ii) a support post attached between the substrate layer and the support layer,
    wherein:
       the reflective layer is a metal layer;
       the substrate and support layers comprise silicon; and
       the support post comprises silicon dioxide.

* * * * *